United States Patent
Shen et al.

(10) Patent No.: US 9,547,579 B1
(45) Date of Patent: Jan. 17, 2017

(54) METHOD AND APPARATUS FOR AUTOMATICALLY DETECTING DEFECTS

(71) Applicant: CA, Inc., New York, NY (US)

(72) Inventors: Tony Shen, Beijing (CN); Kevin Liu, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/585,868

(22) Filed: Dec. 30, 2014

(51) Int. Cl.
G06F 9/44 (2006.01)
G06F 11/36 (2006.01)

(52) U.S. Cl.
CPC ........... *G06F 11/3612* (2013.01); *G06F 11/36* (2013.01); *G06F 11/362* (2013.01); *G06F 11/3604* (2013.01); *G06F 11/368* (2013.01); *G06F 11/3624* (2013.01); *G06F 11/3688* (2013.01)

(58) Field of Classification Search
None
See application file for complete search history.

(56) References Cited

U.S. PATENT DOCUMENTS

| 9,015,668 | B1 * | 4/2015 | Michelsen | G06F 11/3688 717/120 |
| 2007/0006041 | A1 * | 1/2007 | Brunswig | G06F 11/3688 714/38.14 |
| 2008/0086718 | A1 * | 4/2008 | Bostick | G06F 8/71 717/120 |
| 2008/0109790 | A1 * | 5/2008 | Farnham | G06F 11/3688 717/128 |
| 2011/0283138 | A1 * | 11/2011 | Sangubhatla | H04L 41/0813 714/15 |

* cited by examiner

*Primary Examiner* — Lewis A Bullock, Jr.
*Assistant Examiner* — Mark Gooray
(74) *Attorney, Agent, or Firm* — Coats & Bennett, PLLC (57) ABSTRACT

Data being processed by source code modules of a test version of an application is captured and analyzed during execution of the test version of the application. Based on the analysis, errors caused by the source code modules of the test version of the application are automatically detected. Based on a comparison of the source code modules associated with the test version of the application to corresponding source code modules associated with a baseline version of the application, the source code module in the test version of the application that caused the error is identified and reported to a developer or other appropriate personnel so that the error may be corrected.

13 Claims, 5 Drawing Sheets

METHOD AND APPARATUS FOR AUTOMATICALLY DETECTING DEFECTS

BACKGROUND

The present disclosure relates generally to software testing, and particularly to techniques for autonomously debugging software applications to automatically identify errors, as well as the source of those errors.

There are many different software tools and paradigms that are currently available with which software developers can create software applications. Such applications are designed to execute as standalone processes on various different computing devices, while others are designed and implemented to execute on computer servers disposed in a communications network. In some instances, software applications are designed to communicate with each other using a client-server model over such networks to request and retrieve data.

Prior to releasing an application, software developers and test engineers typically execute a rigorous series of tests to verify that the application is working as designed. In some cases, third party testing organizations may also perform a series of independent tests on the application. Regardless of who performs the testing, however, application developers will typically debug the application code to locate the source of a defect whenever an application under test outputs an incorrect or unexpected value.

Current debugging procedures require specialized software tools. Additionally, developers utilizing such tools must set breakpoints and trace the execution of the application code step-by-step to locate the source of the error in the application code. Much of the work in these cases, at least initially, requires the developer to make a "best guess" as to where the source of the error is located in the code. In some instances, whoever performs the test, and/or analyzes the test results, can identify where the error occurred by sifting through a rather large number of entries in one or more log files output by the application during execution. However, these entries may not identify the particular application code that is the cause of the error.

BRIEF SUMMARY

The present disclosure provides a computer-implemented method, a corresponding computing device, and a computer-readable storage medium for automatically detecting errors in an application program at runtime, and for identifying a software module that is causing the error to a user. More particularly, embodiments of the present disclosure automatically capture and analyze data being processed by the various functions of a test version of a software application. Based on that analysis, a control application is able to automatically detect when an error occurs during runtime of the application under test, identify the location of the source code that caused the detected error, and report these findings to a developer or other appropriate personnel for further processing.

In one embodiment, the present disclosure provides a computer-implemented method that calls for receiving data from a test version of an application program executing at a computing device. The test version of the application program comprises a plurality of code modules. Each code module comprises a monitor agent configured to extract the data from an input parameter received by the code module. Further, each code module corresponds to a baseline version of the code module. The method further calls for detecting, while the test version of the application program is executing, a defect in the code module if the data received at the code module is different from baseline data associated with the corresponding baseline version of the code module. Upon detecting the defect, the method calls for determining, at the computing device, whether the code module is causing the defect based on a comparison of source code in the code module to source code in the corresponding baseline version of the code module, and generating a notification identifying the code module as causing the defect based on the comparison of the source code.

In another embodiment, the present disclosure provides a computing device comprising a communications interface circuit and a processor circuit. The communications interface circuit is configured to receive data from a test version of an application program executing at a computing device. The test version of the application program comprises a plurality of code modules, and each code module comprises a monitor agent configured to extract the data from an input parameter received by the code module. Each code module further corresponds to a baseline version of the code module. The processor circuit is configured to detect, during the execution of the test version of the application program, a defect in the code module if the data received at the code module is different from baseline data associated with the corresponding baseline version of the code module, determine whether the code module is causing the defect based on a comparison of source code in the code module to source code in the corresponding baseline version of the code module, and generate a notification identifying the code module as causing the defect based on the comparison of the source code.

Another embodiment of the present disclosure provides a computer-readable storage medium. In this embodiment, the computer-readable storage medium comprises computer-readable code that, when executed by a processing circuit on a computing device, configures the processing circuit to receive data from a test version of an application program executing at a computing device. The test version of the application program comprises a plurality of code modules, and each code module comprises a monitor agent configured to extract the data from an input parameter received by the code module. Further, each code module corresponds to a baseline version of the code module. Additionally, the processing circuit is configured to detect, while the test version of the application program is executing, a defect in the code module if the data received at the code module is different from baseline data associated with the corresponding baseline version of the code module, determine whether the code module is causing the defect based on a comparison of source code in the code module to source code in the corresponding baseline version of the code module, and generate a notification identifying the code module as causing the defect based on the comparison of the source code.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computer-implemented method, a corresponding computing device, and a computer-readable storage medium for automatically detecting errors in an application program at runtime, and for identifying a software module that is causing the error to a user. More particularly, embodiments of the present disclosure automatically capture and analyze the data as it is processed by the various functions of the software application being tested. Based on that analysis, a control application is able to automatically detect when an error occurs during runtime of the application, identify the location of the source code that caused the error, and report these findings to a developer or other appropriate personnel for further processing.

To accomplish this goal, the present disclosure utilizes a baseline version of the application program, as well as some information associated with the baseline version of the application program. More specifically, software applications, especially large enterprise applications, comprise many different types of software modules or files, each containing the source code for one or more functions. Generally, the software developers are responsible for different functions, and thus, create and maintain various modules that include these functions in a planned and structured development process. When completed, the different modules are usually brought together in a build to create an executable application for distribution to end users. Once these builds are tested, they are given version numbers and "baselined" to prevent any further changes to that particular version of the application code. Additionally, the build and software code management systems, which are responsible for maintaining various source code modules and building the application, collect information associated with the build of the application and store that information in memory.

Often times, when application functions are added or fixed, for example, developers will make a copy of a "baselined" version of the application, and then modify the code to create a new or upgraded version of the application. This allows the developers to continue developing the application code without altering the baselined version of the application. However, altering the code in this manner can often cause errors to appear in the software modules that have been changed or altered. As stated above, the location of the source code that causes these errors are, at times, difficult and cumbersome to determine.

Therefore, to accomplish the stated goal, embodiments of the present disclosure integrate the build and source code management systems associated with both the baseline version and the "test" version (i.e., the "new" or "upgraded" version) of the application to automatically identify the software modules that have been altered by developers when a defect is detected. With such knowledge, a control application in communication with the test version of the application would be able to detect when an error occurs and identify the probable source of the defect (e.g., the identity of a particular software module) quickly and easily to the user.

In more detail, each software module (e.g., a file comprising the source code of one or more functions) in an application includes a monitoring agent. The monitoring agent also comprises software code that intercepts the input parameters (if any) of the function calls at the software module during runtime of an application, and outputs the values of those intercepted parameters to a control application.

Embodiments of the present disclosure first execute the baseline version of the application at a computing device. The monitoring agents at the software modules of the baseline version of the application capture a "snapshot" of the values of the intercepted parameters and store them in memory. Since these values are captured from the baseline version of the application code, the values are considered "baseline" values or "correct" values. Thereafter, when a new or updated version of the application is built from the baseline version, it, too, is executed on a computing device. During execution of the "test" version, the monitoring agents in the software modules that are part of the test version of the application also intercept the input parameters (if any) of the function calls, and output the values of those intercepted parameters to the control application. Upon receipt, the control application checks the values received during the execution of the test version of the application against the previously stored "snapshot" values of the baseline version of the application. If the values match, the software module that is responsible for outputting the captured value in the test version of the application is considered to be operating properly. If they are different, however, an error may have occurred. In such cases, embodiments of the present disclosure will identify the error and the particular software module in the test version of the application that is suspected of causing the error, and report that information to a developer or other personnel so that the source code causing the error can be quickly corrected.

With the techniques provided in present disclosure, debugging functions are greatly simplified. For example, users that are responsible for testing an application program no longer need to implement time-consuming debugging procedures, such as setting breakpoints and tracing code, for example, currently used to detect and locate the source of such errors. Rather, by utilizing the build code and the source code management systems that are associated with the application program, the present disclosure can automatically identify the specific software module or modules that are likely to be the cause of the detected error. Further, while debugging procedures occur largely at a controlled site, such as at a development lab, for example, embodiments of the present disclosure allow for the test version of the application to be analyzed on-site during normal execution.

Figure 1:
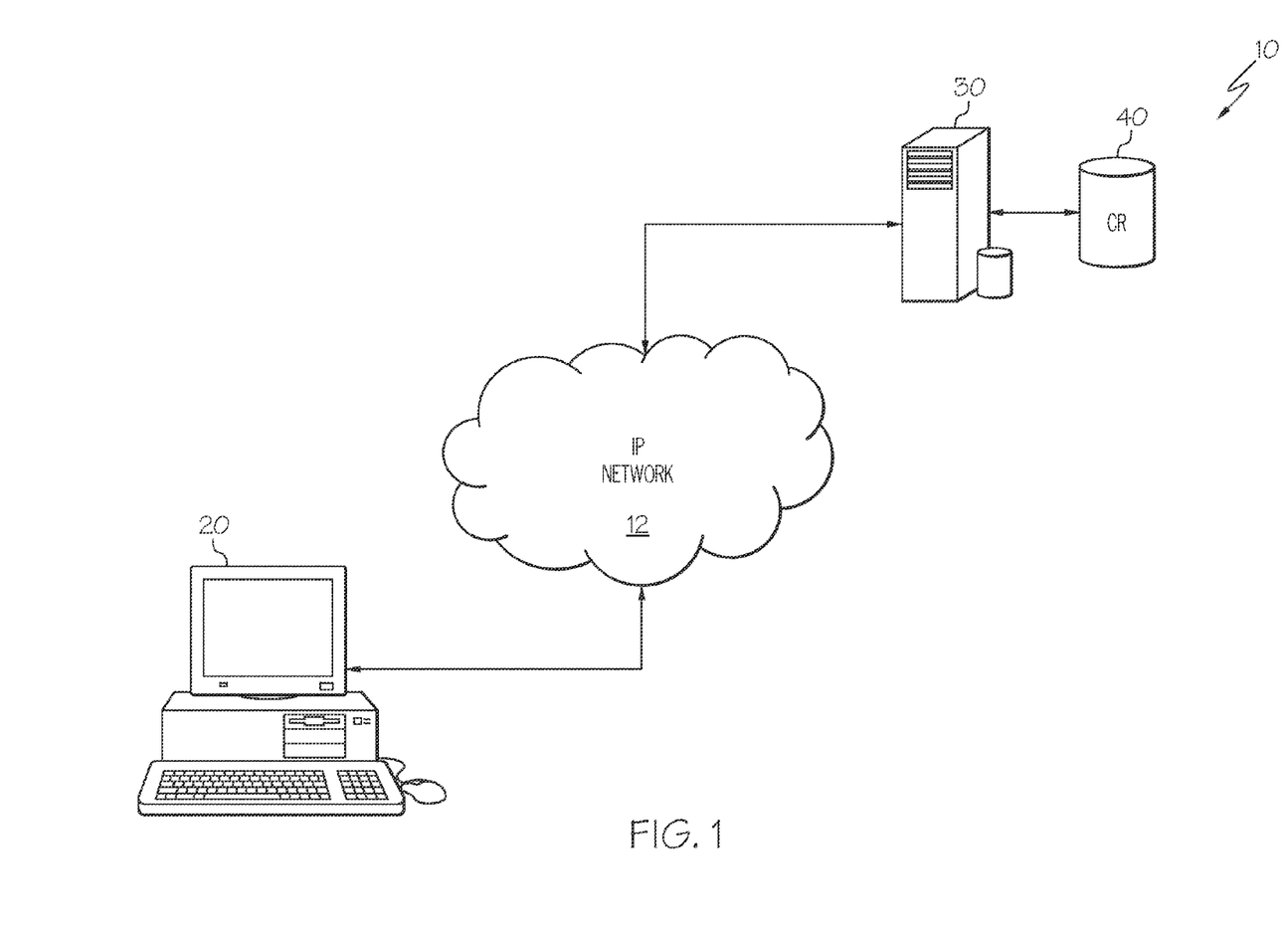
FIG. 1 is a block diagram illustrating some functional components of a communications network configured according to one embodiment of the present disclosure.

Turning now to the drawings, FIG. 1 is a block diagram illustrating some of the components of a computer network 10 configured according to embodiments of the present disclosure. As seen in FIG. 1, an IP network 12, such as the Internet or some other private and/or public packet data network, for example, communicatively interconnects a client terminal 20 with one or more application servers (AS) 30 having access to a data storage medium, such as a code repository (CR) 40. While not specifically shown herein, those of ordinary skill in the art will readily appreciate that any communication protocol, such as the well-known Transmission Control Part/Internet Protocol (TCP/IP), for example, may be used to facilitate communications between the client terminal 20 and the AS 30.

In one embodiment of the present disclosure, the AS 30 executes a control application that is configured to monitor the execution of a test version of an application program. During execution, the monitoring agents in the software modules that comprise the test version of the application capture the values of the parameters received as input into the functions of the software module, and communicate those values to the control application. Upon receipt, the control application compares the captured parameter values against the set of known baseline values captured and stored from the execution of the baseline version of the application program. If the comparison indicates that the values are different, the control application will identify the particular software module that is likely to be producing the error, and report that information to a user.

Specifically, upon detecting an error, the control application retrieves the source code of the software module that is suspected of causing the error from CR 40. The control application then compares the source code of the retrieved software module to the source code of the same software module in the baseline version. If, based on the comparison, the source code is not the same in both software modules, the control application will indicate that difference and identify the particular software module to the user in a report or notification. The user, having being provided with the identity of a specific software module that is suspected of causing the error, is then able to analyze the source code in the identified software module to find and correct the code that is causing the error.

Figure 2:
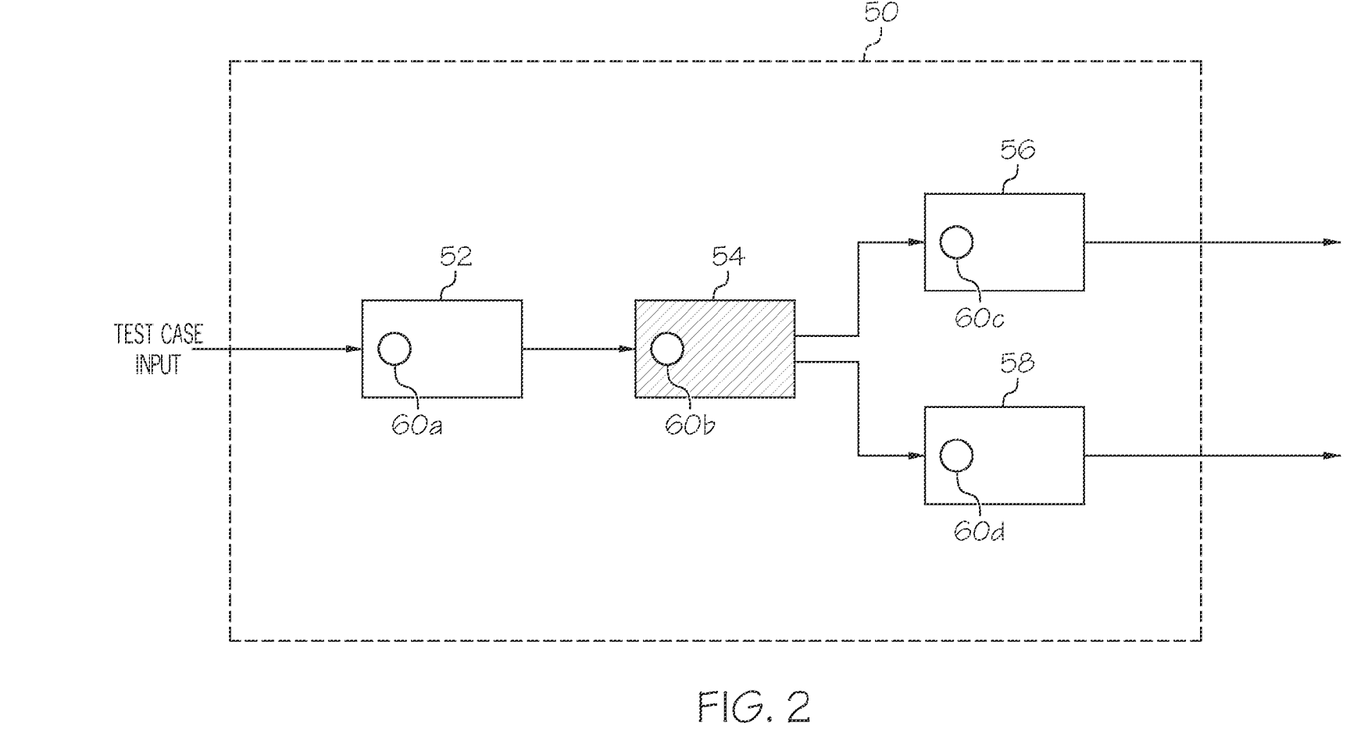
FIG. 2 is a block diagram illustrating some functional components of a software application program under test according to one or more embodiments of the present disclosure.

FIG. 2 is a block diagram illustrating the architecture of a test version of a software application 50 according to one embodiment of the present disclosure. Particularly, as seen in FIG. 2, the test version of the application 50 comprises a plurality of independent, but communicatively connected, software modules 52, 54, 56, 58. Each software module 52, 54, 56, 58 comprises source code for performing various functions of the test version of the application 50, and further, includes a monitor agent 60a, 60b, 60c, 60d (collectively monitor agent 60). Each monitor agent 60a, 60b, 60c, 60d, as previously stated, also comprises code that monitors the input parameters received at a respective software module 52, 54, 56, 58, and captures the particular values of those parameters when the respective software module 52, 54, 56, 58 is invoked at runtime. In addition to the input values, the monitor agents 60 may also capture the particular invocation relationships that exist between the functions in the various software modules 52, 54, 56, 58 that process the application data. Such invocation relationships include, but are not limited to, information and data indicating a path of a command or function call, for example, through the functions of one or more software modules of an application. Methods and techniques for capturing such information are well-known in the art, and thus, not described in detail here.

As seen in FIG. 2, a first software module 52 receives a function call or command, for example. The function call or command may be part of a test use case introduced during a testing procedure, for example, but it may also be a "live" function call or command received during normal operations. Regardless of the type of call or command, as well as when it is received at the software module 52, however, the monitor agent 60a captures the values of the input parameters, if any, as well as the invocation relationship with the function or functions that invoked software module 52, and reports that information to the control application executing at AS 30.

The control application will then compare the captured data to the corresponding "baseline" data captured during the execution of the baseline version of the application. If the comparison indicates that the data captured during the execution of the test application 50 is the same as the data captured during execution of the baseline version of the application, no action is taken. That is, the software module receiving the command or function call will be permitted to perform its functions and invoke the next software module (in this case, software module 54). However, if the comparison reveals that the captured data is different from the "baseline" data, the control application will detect a possible error in the code, identify the particular source module that contains the code likely to have caused the error, and report the information to the user.

By way of example only, FIG. 2 illustrates that the data captured by monitoring agent 60a at software module 52 is the same as the "baseline" data associated with the baseline version of the application. Thus, software module 52 invokes a function at the next software module 54, and passes that function various input parameters. Monitor agent 60b at software module 54 then captures the values of the input parameters, as well as the data indicating the invocation relationships, and passes that captured information to the control application executing on AS 30. The resultant comparison performed by the control application reveals that the captured data is different from the baseline version, and thus, the source code in one of the software modules may be defective.

The control application of the present disclosure is configured to detect defects of any type and from any of the software modules 52, 54, 56, 58 that comprise the test version of the application 50. However, for illustrative purposes, the defect occurring in this embodiment is caused because a function at software module 54 was not properly upgraded to accept upgraded input parameters from a calling function at software module 52. As described later in more detail, the control application at AS 30 identifies the particular defect, as well as the identity of the particular software module 54, to the user. Knowing the particular module that contains the error, the user (e.g., the developer) is able to quickly and easily address the source of the error.

As stated previously, software module 54 may be comprised of one or more functions that process the data received by the module. Further, in many cases, the functions that comprise software modules such as software module 54 may themselves invoke any number of sub-modules comprised of one or more other functions for processing the data. Any of these sub-modules may be the cause of a defect. Therefore, according to the present disclosure, each of the sub-modules also comprises a monitor agent that captures incoming data parameters and invocation relationships, and that passes that information to the control application at AS 30 to allow the control application to determine which of the sub-modules, if any, is the source of a detected error.

Figure 3:
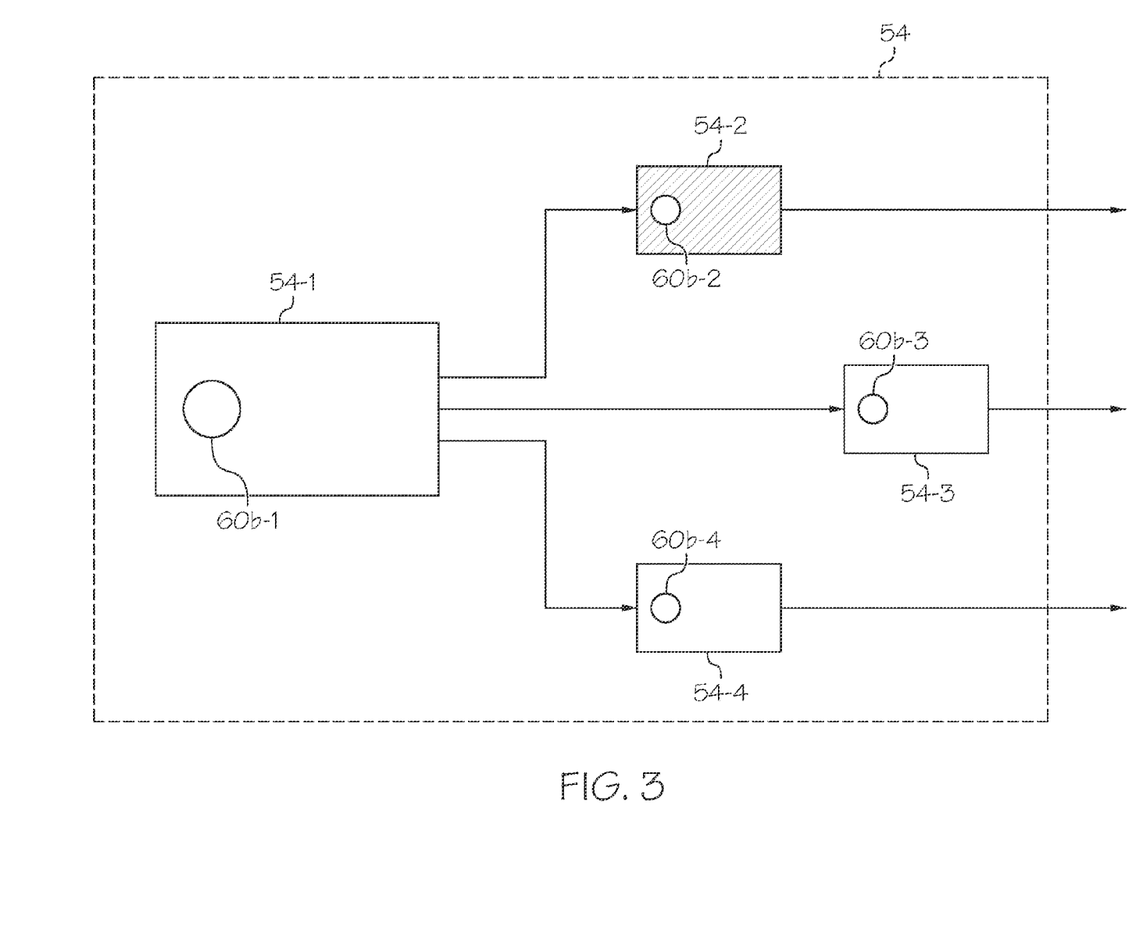
FIG. 3 is a block diagram illustrating some functional components of the software application program under test according to another embodiment of the present disclosure.

For example, FIG. 3 illustrates a more detailed embodiment of software module 54, which as seen in the example of in FIG. 2, was shown to be the source of a defect. As seen in FIG. 3, source module 54 is comprised of 4 different sub-modules 54-1, 54-2, 54-3, and 54-4. Each sub-module further comprises a respective monitor agent 60b-1, 60b-2, 60b-3, and 60b-4, each of which functions similarly to the monitor agents 60 previously described.

Upon being invoked, the data and information captured by the monitor agent 60a-1 is captured and analyzed by the control application, as previously described, and determined to be normal. However, when a function at sub-module 54-1 invokes a function at sub-module 54-2, the control application determines, based on the comparison of the captured data to the "baseline" data captured during the execution of the baseline version of the application, that sub-module 54-2 comprises a defect. Control application then indicates the defect, as well as the identity of sub-module 54-2, to the user. So indicated, the user (e.g., the developer) will know that the source code in the software module 54 of test version of application 50 is likely defective, and in at least some cases, identify the particular sub-module 54-2 that is defective.

As seen in FIGS. 2 and 3, the present disclosure is configured to detect and process defect information for software modules that call each other. However, those of ordinary skill in the art should realize that the present disclosure is not so limited. Embodiments of the present disclosure are also able to process such defects even when a function within a software module is a recursive function.

Thus, the monitoring agent associated with the software module will capture the input parameter data and the recursive invocation relationship, and report that information to the control application at AS 30. Upon receipt, the control application will compare the received information to the corresponding "baseline" information of the baseline version of the application, and notify the user as previously described.

Additionally, embodiments of the present disclosure can automatically detect errors even when the code that causes the errors is contained in a call to an external function (e.g., a library function call) that does not include a monitoring agent. In these cases, the data that is returned from the external function is captured by the monitoring agent and sent to the control application for analysis in the same manner as previously described. So long as the captured data returned by the external function in the test version of the application 50 is the same as the captured data for the baseline version of the application, no defect is detected. However, if the data is different, the control application will identify the defect, the software module that invoked the external function, and, if possible, the identity of the external function that was called to the user.

Figure 4:
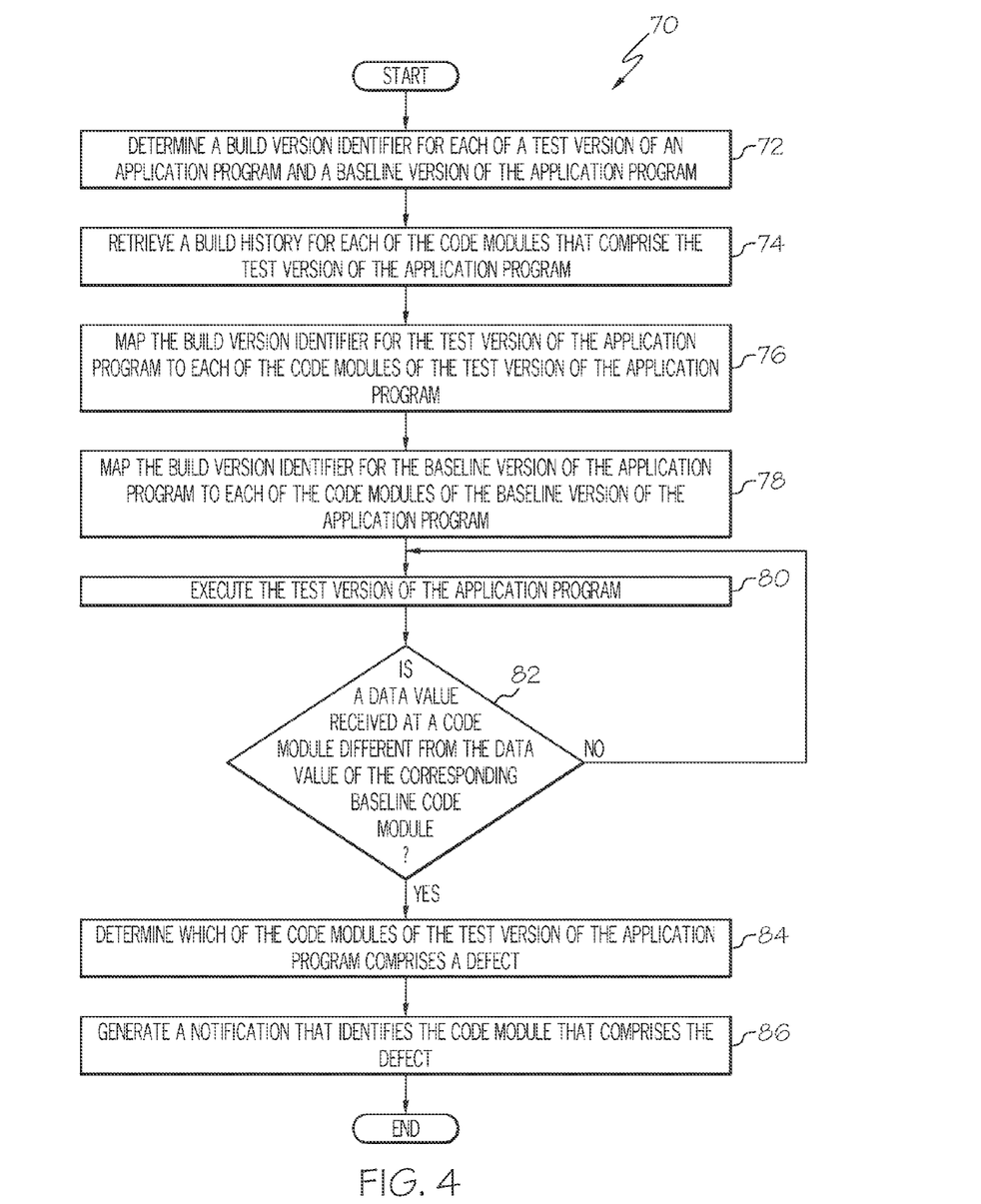
FIG. 4 is a flow diagram illustrating a method for analyzing a software application according to one embodiment of the present disclosure.

FIG. 4 is a flow diagram illustrating a method 70 for performing embodiments of the present disclosure to particularly detect an error in a test version of application 50, identify the particular software module that is likely to contain the code causing the error, and report the error to the user. Method 70 is performed by a control application executing at a computing device, such as AS 30, for example, and assumes that the baseline data from the execution of the baseline version of the application has already been captured and stored in a memory circuit or database that is accessible to AS 30.

As previously stated, embodiments of the present disclosure integrate build code and source code management systems that are associated with both the baseline version and the test version of an application. This information allows the control application to identify the particular software modules that have been altered by developers, and thus, the potential causes of a given defect. Therefore, method 70 begins with the control application at AS 30 determining a build version for each of the baseline version of the application and the test version of the application (box 72), and storing that information in memory. In one embodiment, the build version for the application program comprises a versioning number (e.g., v. 1.0) that indicates the particular version of the application. As is conventional, such versioning numbers typically identify a major and minor release of an application, and are generally assigned in increasing order. Thus, both the baseline version of the application and the test version of the application 50, will comprise a version number. For illustrative purposes only, the version number for the baseline version of the application is v. 1.0. However, since the test version of the application is built from the baseline version, the version number of the test version may be v. 1.1. Generally, the particular values for the version numbering are not germane to the present disclosure, but the version number of the test version of the application is generally greater than the version number of the baseline version of the application.

As an alternative to version numbers, the build version may comprise a code name, such as LEOPARD, LION, and MOUNTAIN LION given to OS X by APPLE. In these cases, the control application would be aware which code name identifies the baseline version of the application. Again, however, the build version utilized by the present disclosure is not limited to either version numbers or code names. In some embodiments, for example, the build version may comprise a combination of both a build number as well as a code name.

The control application then retrieves a build history for each of the software modules that comprise the baseline version of the application program, and a build history for each of the software modules that comprise the test version of the application program (box 74). Such build history information can identify any information needed or desired, but in one embodiment, comprises versioning information for the particular software modules (e.g., v. 2.1), data indicating when each software module was used in a build, a list of modifications that were made to the software module after its use in building the baseline version of the application, an identifier (e.g., a username) of a developer that made the modification, a date and time that the modifications were made, and the like.

It should be noted that in some cases, some of the software modules comprising the test version of the application 50 will be the same as the software modules that comprise the baseline version of the application. Further, the code in these software modules may not have changed since the baseline version was built. In these cases, both the version numbers and the build history information that is retrieved for the software modules in the baseline version of the application would be the same as that retrieved for the test version of the application.

Once the version numbers and the build histories have been retrieved, the control application maps the version numbers to the software modules of each application version. That is, given a version number of v. 1.0 for the baseline version of the application, the control application will associate each software module in the baseline version of the application with the versioning number 1.0 (box 76). Similarly, given a versioning number of v. 1.1 for the test version of the application 50, the control application will associate each software module in the test version with the version number v. 1.1 (box 78). Such mapping enables the control application to match the software modules in the test version of the application 50 to the corresponding software modules in the baseline version of the application.

Once the mapping is complete, the test version of the application 50 is executed (box 80). Although the test version of the application 50 may be executed on any computing device needed or desired, execution in this embodiment occurs at the AS 30. While the test version of application 50 is executing, a user (e.g., a developer or tester) can inject various commands into the test version of the application 50 to fully test the functionality of the software modules of the test version of application 50.

Regardless of the types of commands, and regardless of where they originate, embodiments of the present disclosure will monitor the information being processed by each of the software modules, and based on that monitoring, will detect whether a given software module comprises a defect. Specifically, as previously described, the monitor agent 60 in each software module of the test version of the application 50 captures input parameters whenever the functions in the software modules are invoked. This captured information is then sent by the monitoring agents 60 to the control application for analysis. Upon receipt, the control application determines whether the received information is different from the baseline information (box 82), and if so, utilizes the retrieved build history of the source modules, the version number information, and the mapping information to identify the particular source module that may have caused the error (box 84). So identified, the control application can then compare the source code in the source module associated with the test version of the application 50 to the corresponding to the source code in the source module associated with the baseline version of the application, and based on these results, determine whether the software module in the test version of the application 50 was changed from the corresponding version of the software module in the baseline version of the application, and identify that information in the notification generated for the user (box 86).

Figure 5:
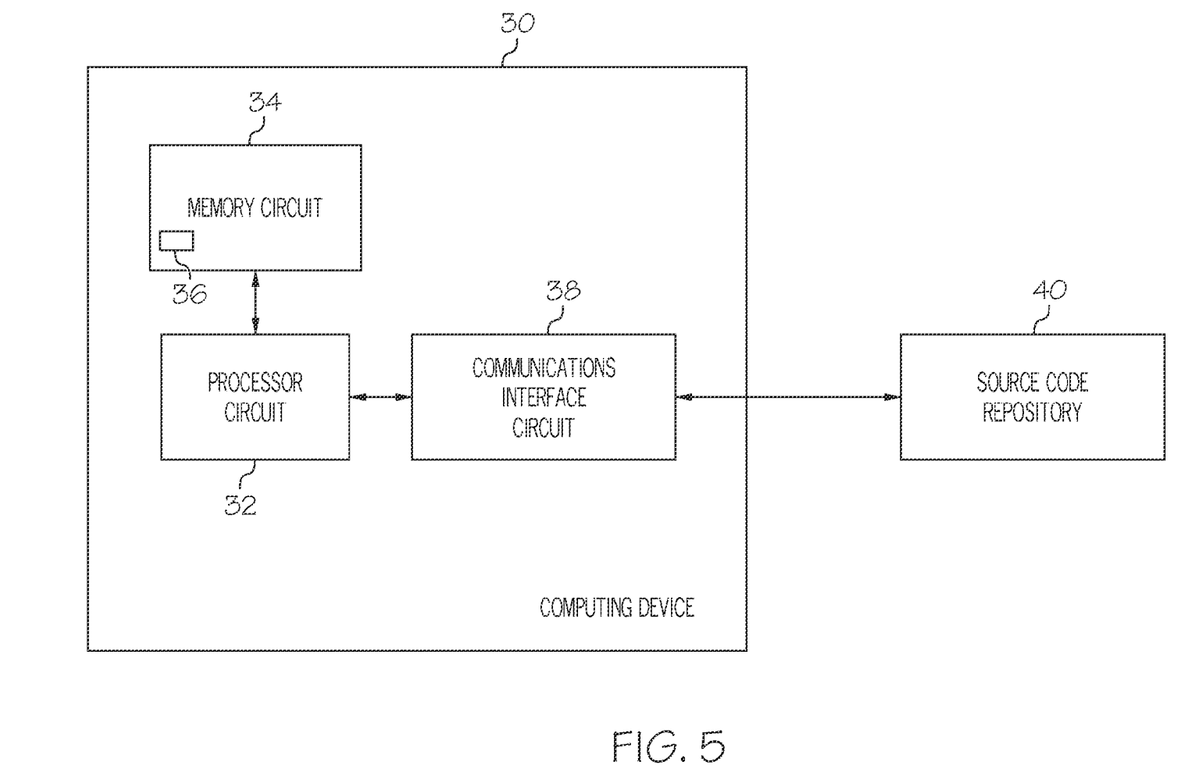
FIG. 5 is a block diagram illustrating some functional components of a computing device configured to execute a software application according to one embodiment of the present disclosure.

FIG. 5 is a block diagram illustrating some of the functional components of an AS 30 configured according to the embodiments previously described. As seen in FIG. 5, the AS 30 comprises a processor circuit 32, a memory circuit 34 that stores a control application 36, and a communications interface 38. Those skilled in the art will readily appreciate that the AS 30 seen in FIG. 5 may comprise more or fewer functional components that are illustrated here.

The processor circuit 32 may be implemented as one or more microprocessors, hardware, firmware, software, or a combination thereof, and generally controls the operation and functions of AS 30 according to the appropriate standards. Such operations and functions include, but are not limited to, communicating with remote devices and applications executing on one or more of the client terminal 20 and AS 30, as previously described. In this regard, the processor circuit 32 may be configured to the implement logic and instructions of control application 36 stored in memory 34 to perform the functionality of the embodiments of the present disclosure, as previously described. Such functions include, but are not limited to, the receipt of information from the monitoring agents 60, and the analysis of that information to determine whether any of the software modules that comprise the application under test are defective. If a defect is detected, the processor circuit 32, under the control of the control application 36, will identify those defective software modules, as previously described.

Memory 34 may comprise any non-transitory, solid state memory or computer readable storage media known in the art. Suitable examples of such media include, but are not limited to, ROM, DRAM, Flash, or a device capable of reading computer-readable storage media, such as optical or magnetic media. The memory circuit 34 stores programs and instructions, such as control application 36, that, as stated above, controls the processor circuit 32 to receive information from the monitoring agents 60, analyze that information to determine whether the software modules that comprise the application are defective, and if so, notify a developer or other user, as previously described.

The communications interface 38 comprises a transceiver or other communications interface that facilitates communications with the source code repository (CR) and the client terminal 20 via IP network 12. Those of ordinary skill in the art will appreciate that the communications interface may be configured to communicate with these entities using any protocol known in the art. However, in one embodiment, the communications interface comprises an ETHERNET card configured to transmit and receive data using the well-known TCP/IP protocol.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:

receiving data from a test version of an application program executing at a computing device, wherein the test version of the application program comprises a plurality of code modules, and wherein each code module of the plurality of code modules comprises a monitor agent configured to extract the data from an input parameter received by the code module, and wherein each code module further corresponds to a baseline version of the code module that comprise a baseline version of the application program;

determining a build version identifier for the test version of the application program;

determining a build version identifier for the corresponding baseline version of the application program;

obtaining a build history for each of the plurality of code modules in the test version of the application program;

mapping the build version identifier for the test version of the application program to each of the plurality of code modules in the test version of the application program;
mapping the build version identifier for the corresponding baseline version of the application program to each baseline code module in the corresponding baseline version of the application program;
detecting, while the test version of the application program is executing, a defect in a first code module if the data extracted from a first input parameter by a first monitor agent at the first code module is different from baseline data associated with the corresponding baseline version of the first code module; and
responsive to detecting a defect in the first code module:
identifying the first code module based on the build version identifiers, the mappings, and on the build history for the first code module;
determining, at the computing device, whether source code in the first code module associated with the defect has not been updated to process the first input parameter based on a comparison of the source code in the first code module to source code in the corresponding baseline version of the first code module; and
generating a notification identifying the first code module as causing the defect based on the comparison.

2. The method of claim 1 further comprising determining, based on the build history, whether the source code in the first code module is different than the source code in the corresponding baseline version of the first code module.

3. The method of claim 1 wherein determining, at the computing device, whether source code in the first code module associated with the defect has been updated comprises:
retrieving the source code for the first code module from a source code repository;
retrieving the source code for the corresponding baseline version of the first code module from the source code repository;
and
determining whether the source code in the first code module associated with the defect has been updated to process the first input parameter based on whether the source code for the first code module is different from the source code for the corresponding baseline version of the first code module.

4. The method of claim 1 wherein determining, at the computing device, whether source code in the first code module associated with the defect has been updated to process the first input parameter further comprises determining whether the first code module was invoked with the first input parameter comprising an incorrect data value.

5. The method of claim 1 wherein the data received from the test version of the application program further comprises information indicating an invocation relationship for the first code module.

6. The method of claim 1 further comprising monitoring data values that are output by the first code module.

7. A computing device comprising:
a communications interface circuit configured to receive data from a test version of an application program executing at a computing device, wherein the test version of the application program comprises a plurality of code modules, and wherein each code module of the plurality of code modules comprises a monitor agent configured to extract the data from an input parameter received by the code module, and wherein each code module further corresponds to a baseline version of the code module that comprise a baseline version of the application program; and
a processor circuit configured to:
determine a build version identifier for the test version of the application program;
determine a build version identifier for the corresponding baseline version of the application program, and
obtain a build history for each of the plurality of code modules in the test version of the application program;
map the build version identifier for the test version of the application program to each of the plurality of code modules in the test version of the application program;
map the build version identifier for the corresponding baseline version of the application program to each baseline code module in the corresponding baseline version of the application program;
identify a first code module based on the build version identifiers, the maps, and on the build history for the first code module;
detect, during the execution of the test version of the application program, a defect in the first code module if the data extracted from a first input parameter by the monitor agent at the first code module is different from baseline data associated with the corresponding baseline version of the first code module; and
responsive to detecting a defect in the first code module:
determine whether source code in the first code module associated with the defect has not been updated to process the first input parameter based on a comparison of the source code in the first code module to source code in the corresponding baseline version of the first code module; and
generate a notification identifying the first code module as causing the defect based on the comparison.

8. The computing device of claim 7 wherein the processor circuit is further configured to determine, based on the build history, whether the source code in the first code module is different than the source code in the corresponding baseline version of the first code module.

9. The computing device of claim 7 wherein the processor circuit is further configured to:
retrieve the source code for the first code module from a source code repository;
retrieve the source code for the corresponding baseline version of the first code module from the source code repository;
and
determine whether the source code in the first code module associated with the defect has been updated to process the first input parameter based on whether the source code for the first code module is different from the source code for the corresponding baseline version of the first code module.

10. The computing device of claim 7 wherein the processor circuit is further configured to determine whether the first code module was invoked with the first input parameter comprising an incorrect data value.

11. The computing device of claim 7 wherein the processor circuit is further configured to determine an invocation relationship for the first code module based on information sent by the first code module.

12. The computing device of claim 7 wherein the processor circuit is further configured to monitor data values that are output by the first code module during the execution of the test version of the application program.

13. A non-transitory computer-readable storage medium comprising computer-readable code that, when executed by a processing circuit on a computing device, configures the processing circuit to:

receive data from a test version of an application program executing at a computing device, wherein the test version of the application program comprises a plurality of code modules, and wherein each code module of the plurality of code modules comprises a monitor agent configured to extract the data from an input parameter received by the code module, and wherein each code module further corresponds to a baseline version of the code module that comprise a baseline version of the application program;

determine a build version identifier for the test version of the application program;

determine a build version identifier for the corresponding baseline version of the application program; and obtain a build history for each of the plurality of code modules in the test version of the application program;

map the build version identifier for the test version of the application program to each of the plurality of code modules in the test version of the application program;

map the build version identifier for the corresponding baseline version of the application program to each code module in the corresponding baseline version of the application program;

detect, while the test version of the application program is executing, a defect in a first code module if the data extracted from a first input parameter by a first monitor agent at the first code module is different from baseline data associated with the corresponding baseline version of the first code module; and responsive to detecting a defect in the first code module:
identify the first code module based on the build version identifiers, the maps, and on the build history for the first code module;
determine whether source code in the first code module associated with the defect has been updated to process the first input parameter based on a comparison of the source code in the first code module to source code in the corresponding baseline version of the first code module; and generate a notification identifying the first code module as causing the defect based on the comparison.

\* \* \* \* \*